Patented Feb. 1, 1944

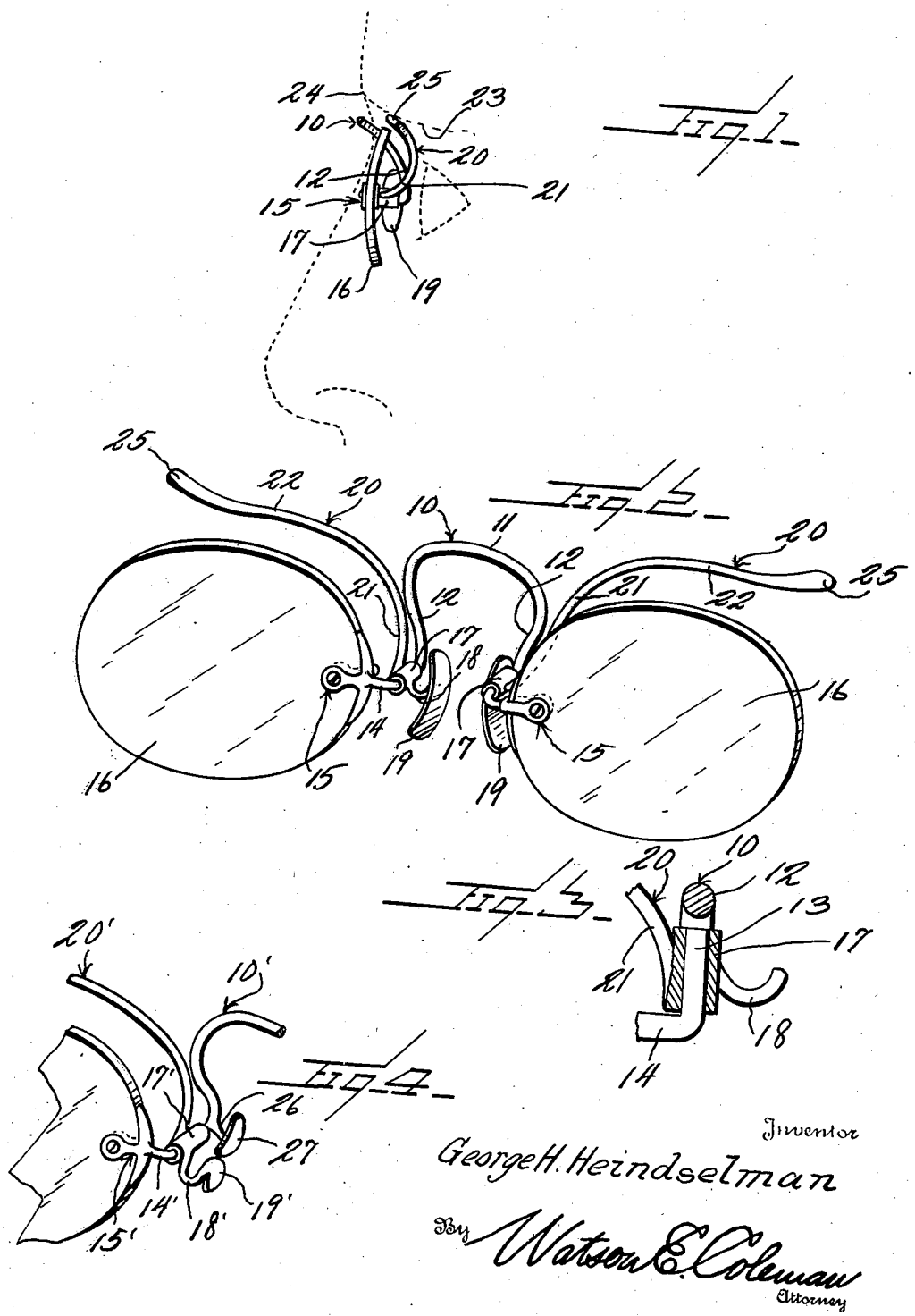

2,340,663

UNITED STATES PATENT OFFICE 2,340,663

EYEGLASSES

George H. Heindselman, Provo, Utah

Application February 26, 1942, Serial No. 432,498

2 Claims. (Cl. 88—50)

This invention relates generally to the class of optics and pertains particularly to improvements in eyeglasses.

The principal object of the present invention is to provide in the class of eyeglasses an improved and novel means of effecting the gripping of the nose by the nose pads without the use of spring gripping means such as is at present inherent in the construction of the well known "pince-nez" or pinch-nose type of eyeglass.

In the pinch-nose type of eyeglass considerable pressure is usually applied to the nose by the nose pads which causes soreness and pain, while in the type of eyeglasses employing a frame and temple bars the lenses cannot always be maintained in proper position due to strains or pulls on the temple bars and the bars frequently cause irritation if applied too tightly to the ears.

The present invention aims to eliminate the unpleasant features associated with the use of the pinch-nose and temple bar type eyeglass by providing a nose bridge, to which the lenses are attached, having mounted thereon a pair of oppositely extending arms which are oscillatable and carry nose pads at their adjacent ends while the major portion of each arm extends beneath and engages against the upper part of the eye socket below the superciliary arch.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing—

Figure 1 is a view in side elevation of a pair of eyeglasses constructed in accordance with the present invention, the same being shown in association with the dotted outline of the portions of the face with which they are engaged.

Figure 2 is a view in perspective of eyeglasses constructed in accordance with the present invention.

Figure 3 is a detailed sectional view on an enlarged scale through the axle and sleeve connection between an arm and one side of the bridge.

Figure 4 is a detailed view of a modified form in which a fixed and an oscillatable nose pad are employed at each side of the nose.

In carrying out the present invention there is provided the usual lens connecting bridge piece which is indicated generally by the numeral 10 and which, in the present case, comprise an arch portion 11 from the sides of which extend the side legs 12 which, when the eyeglasses are in use as shown in Figure 1, extend downwardly and inwardly across the two sides of the nose.

Each of the side portions of the bridge joins at its lower end a horizontal forwardly extending short portion 13 of circular cross-section which forms a pivot axle for a part hereinafter described. The forward end of each horizontal portion or pivot axle 13 then merges into the laterally extending arm 14 which is integrally connected with the lens clamp which is indicated generally by the numeral 15. The lenses here shown are of the rimless type and are indicated by the numeral 16, but it will be readily apparent that the invention may, if desired, be employed in association with rims to which the arms 14 would be joined.

Upon each axle portion of the bridge 10 there is oscillatably supported the short sleeve 17. Each of these sleeves has connected with the inner side thereof the short pad finger 18 which is integral with and supports a pad 19 which engages against a side of the nose.

Connected with the opposite side of each sleeve 17 from the pad is an oscillatable arm which is indicated as a whole by the numeral 20 and which comprises the inner and upwardly and laterally or outwardly bowed portion 21, the end of which is attached to the sleeve 17, which merges into the relatively long outer terminal portion 22 which is designed to bear against the under side of the boney arch 23 of the eye socket lying below the superciliary arch 24. This outer end or terminal portion 22 of each of the oscillatable or pressure applying arms 20 may be slightly flattened if desired, as indicated at 25, to more comfortably bear against the flesh.

As is clearly shown in Figure 1, the rearwardly curving formation of the leg portions 12 of the arch 10 permits the pad to be placed well in toward the eye upon the two sides of the nose thereby bringing the oscillatable arms 20 into the desired position beneath the arch or top portion of the eye socket. By the proper adjustment of the parts the oscillatable arms 20 may be made to bear with sufficient pressure against the surfaces 23 of the eye socket to force the pads 19 together sufficiently to firmly hold the bridge of the nose and thus maintain the eyeglasses in proper position.

Because of the fact that the construction of the present device permits the glasses to be set in close to the eyes it will be readily seen that smaller lenses may be employed and also in the use of toric lenses the same may be cut on a curvature closely approaching the curve of the eyeball so that as the eye moves up and down or in and out the pupil of the eye will be maintained at practically the same distance from the lens at all times so that the vision through the lens in all directions will be uniform.

Figure 4 illustrates a slight modification of the structure shown in Figure 2. In this modified form the bridge is indicated by the numeral 10' and is of substantially the same construction as the bridge 10 in that it has a portion, not illustrated, corresponding with the axle 13 upon which is oscillatably mounted the sleeve 17' for the oscillatable arm 20' and a laterally turned arm 14' which connects with the lens clamp 15'.

The nose pad which is connected with the sleeve 17' in the modified construction is indicated by the numeral 19' and is connected to the sleeve by the finger portion 18' which may be joined to the sleeve adjacent the forward end. Inwardly of the pad 19' the bridge carries a pad supporting finger 26 on which is mounted a fixed pad 27. Thus there would be provided in a pair of eyeglasses constructed in accordance with the modification shown in Figure 4, a pair of the fixed pads 27 which rests against the opposite sides of the nose while the pair of oscillatable pads 19', one only of which is here illustrated although it will be readily apparent that there would be two in the complete eyeglass structure, have yieldable engagement with the sides of the nose forwardly of the fixed pads.

When the eyeglasses constructed in accordance with the present invention are in use, the major portion of each of the oscillatable arms 20 is to a great extent hidden from view as it will press against the top arch 23 of the eye socket and be partially covered by the overlying eyebrow. Thus the means by which the eyeglasses are held in place will not be readily noticed, but the glasses will at the same time be firmly, though not too tightly, held in position.

It will also be readily apparent that, if desired, the oscillatable arms 20 may be attached without the pivot sleeve, directly to the side of the arch of glasses of the ordinary pinch-nose type so as to flex the arch 10 sufficiently to bring the nose pads into the desired gripping relation for holding the nose. The arms may also be used in connection with the regular nose type mounting to do away with or eliminate the temple bars.

While the invention has been illustrated and described as being joined to or mounted on a horizontal continuation of the bridge piece at each side of the same, it is contemplated as being within the scope of the invention to mount the sleeve upon an auxiliary axle extending from the part 14 upon the outer side of the bridge piece if such construction is found desirable to suitably fit the glasses to the wearer.

It is also to be understood that the arms 20 may be made of any desired length and may be bent or curved in various ways to suit the needs of the individual.

What is claimed is:

1. In a pair of eyeglasses, a bridge piece having side portions, said side portions each being formed at its lower portion to provide a short axle portion extending substantially perpendicularly to the plane of the lenses, said axle portion being forwardly disposed with respect to the side portion of the bridge piece, the outer extremity of said axle portion being provided with a laterally and outwardly directed arm, means for coupling said arm to a lens, a sleeve oscillatable upon each axle, a nose pad connected with each sleeve, and a pair of arms each connected at one end with said sleeve and curving upwardly and laterally adjacent to the inner and top edges of the adjacent lens.

2. An eyeglass construction as set forth in claim 1 with an additional pair of fixed pads each attached to a side portion of said bridge piece closely adjacent to the inner extremity of an axle portion.

GEORGE H. HEINDSELMAN.